(12) United States Patent
Papasakellariou et al.

(10) Patent No.: US 9,603,125 B2
(45) Date of Patent: Mar. 21, 2017

(54) REFERENCE SIGNAL DESIGN AND ASSOCIATION FOR PHYSICAL DOWNLINK CONTROL CHANNELS

(71) Applicant: Samsung Electronics Co. Ltd., Suwon-si, Gyeonggi-do (KR)

(72) Inventors: Aris Papasakellariou, Dallas, TX (US); Joonyoung Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 52 days.

(21) Appl. No.: 13/744,969

(22) Filed: Jan. 18, 2013

(65) Prior Publication Data

US 2013/0188577 A1 Jul. 25, 2013

Related U.S. Application Data

(60) Provisional application No. 61/588,590, filed on Jan. 19, 2012, provisional application No. 61/673,899, filed on Jul. 20, 2012.

(51) Int. Cl.
| | |
|---|---|
| *H04W 72/04* | (2009.01) |
| *H04L 1/00* | (2006.01) |
| *H04W 72/00* | (2009.01) |
| *H04L 5/00* | (2006.01) |
| *H04W 48/12* | (2009.01) |

(52) U.S. Cl.
CPC ........... *H04W 72/04* (2013.01); *H04L 1/0038* (2013.01); *H04L 5/0023* (2013.01); *H04L 5/0051* (2013.01); *H04L 5/0053* (2013.01); *H04L 5/0016* (2013.01); *H04L 5/0035* (2013.01);

(Continued)

(58) Field of Classification Search
None
See application file for complete search history.

(56) References Cited

U.S. PATENT DOCUMENTS

2009/0325585 A1 12/2009 Farajidana et al.
2010/0317360 A1 12/2010 McBeath et al.
(Continued)

FOREIGN PATENT DOCUMENTS

KR 10-2011-0122046 A 11/2011

OTHER PUBLICATIONS

3GPP TSG RAN WG1 Meeting #67, "E-PDCCH Transmission with DMRS as Demodulation RS," R1-113958, San Francisco, Nov. 14, 2011, pp. 1-4.*

(Continued)

*Primary Examiner* — Donald Mills
(74) *Attorney, Agent, or Firm* — Jefferson IP Law, LLP

(57) ABSTRACT

A method and apparatus for designing a Reference Signal (RS) used by a User Equipment (UE) to obtain respective channel estimates for demodulating respective Physical Downlink Control CHannels (PDCCHs), for determining at a UE a number of resource blocks to include for a reception of a Physical Downlink Shared CHannel (PDSCH), for determining at a UE a RS antenna port in order to enable spatial multiplexing of Enhanced PDCCH (EPDCCH) transmissions to different UEs, and for supporting Quadrature Amplitude Modulation 16 (QAM16) modulation, in addition to Quadrature Phase Shift Keying (QPSK) modulation, for EPDCCH transmissions without increasing a number of decoding operations at a UE are provided.

32 Claims, 13 Drawing Sheets

(52) U.S. Cl.
CPC ........... *H04L 5/0044* (2013.01); *H04W 48/12* (2013.01); *H04W 72/00* (2013.01)

(56) References Cited

U.S. PATENT DOCUMENTS

| | | |
|---|---|---|
| 2011/0205995 A1 | 8/2011 | Grovlen |
| 2011/0310829 A1 | 12/2011 | Ji et al. |
| 2013/0058285 A1* | 3/2013 | Koivisto et al. ............. 370/329 |
| 2013/0064216 A1* | 3/2013 | Gao .................... H04L 5/0016 370/330 |
| 2013/0100901 A1* | 4/2013 | Shan .................... H04L 5/0048 370/329 |
| 2013/0114525 A1* | 5/2013 | Ahmadi ....................... 370/329 |
| 2013/0194931 A1* | 8/2013 | Lee et al. ..................... 370/241 |
| 2014/0233518 A1* | 8/2014 | Lee et al. ..................... 370/329 |

OTHER PUBLICATIONS

3GPP TSG RAN WG1 Meeting #67, "Reference Signals for Enhanced Control Channels," R1-113678, San Francisco, Nov. 14, 2011, pp. 1-2.*

3GPP TSG RAN WG1 Meeting #67, "Way Forward on Enhanced Physical Downlink Control Channel Al 7.7," R1-114432, San Francisco, Nov. 14, 2011, pp. 1-2.*

3GPP TSG RAN WG1 Meeting #66, "Discussion on ePDCCH Design Issues," R1-112517, Aug. 2011, pp. 1-4.*

3GPP TSG RAN WG1 Meeting #66, "Investigation on Downlink Control Channel and Signalling Enhancements," R1-112049, Aug. 2011, pp. 1-4.*

3GPP TSG RAN WG1 Meeting #67, "Mapping Design for E-PDCCH in Rel-11," R1-114081, Nov. 2011, pp. 1-5.*

3GPP TSG RAN WG1 Meeting #67, "DM-RS Design for E-PDCCH in Rel-11," R1-114302, Nov. 2011, pp. 1-3.*

3GPP TSG RAN WG1 Meeting #67, "DM-RS Based Distributed and Localized E-PDCCH Structure," R1-114239, Nov. 2011, pp. 1-4.*

Huawei et al, DCI for Rel-10 downlink MIMO, 3GPP Draft, R1-105135, Oct. 5, 2010, Xi'an, China.

ZTE, Consideration for DMRS enhancement in CoMP, 3GPP Draft, R1-113765, Nov. 8, 2011, San Francisco, USA.

CATT, Layer-to DMRS port mapping, 3GPP Draft, R1-101766, Apr. 6, 2010, Beijing, China.

Hitachi Ltd, DMRS enhancement for CoMP, 3GPP Draft, R1-113969, Nov. 9, 2011, San Francisco, USA.

Nokia Siemens Networks et al, DM-RS enhancements for CoMP, 3GPP Draft, R1-114319, Nov. 9, 2011, San Francisco, USA.

Huawei et al, DMRS enhancements for geographically distributed antennas, 3GPP Draft, R1-112051, Aug. 16, 2011, Athens, Greece.

Texas Instruments, On multiplexing of ePDCCH with PDSCH, 3GPP Draft, R1-113792, San Francisco, USA, Nov. 8, 2011.

QUALCOMM Incorporated, R-PDCCH Design, 3GPP Draft, R1-102344, Beijing, China, Apr. 6, 2010.

Interdigital Communications, Consideration on Reference Signal for E-PDCCH, 3GPP Draft, R1-113932, San Francisco, USA, Nov. 9, 2011.

Ericsson et al, On enhanced PDCCH design, 3GPP Draft, R1-112928, Zhuhai, China, Oct. 4, 2011.

* cited by examiner

FIG. 2
(Prior Art)
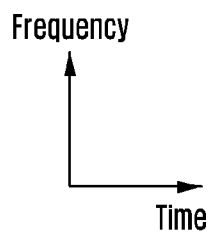
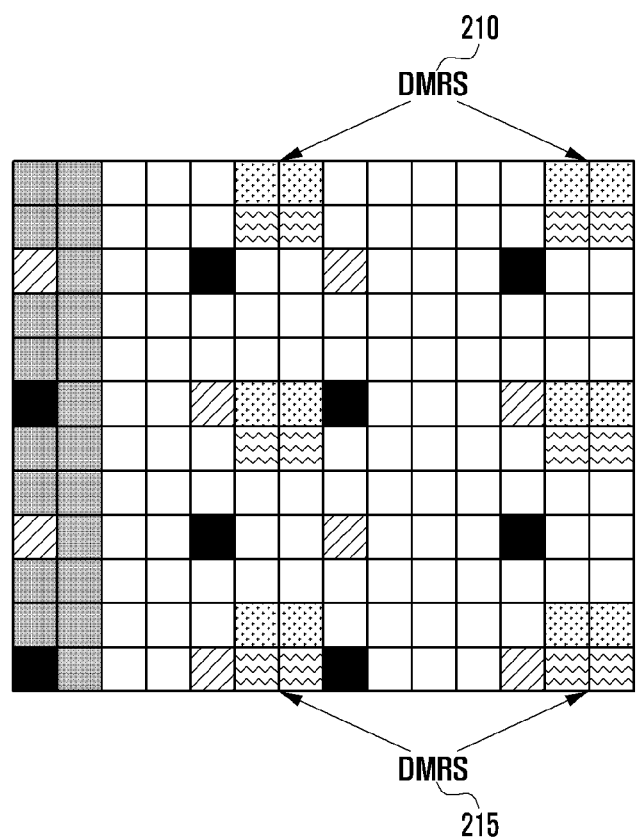

REFERENCE SIGNAL DESIGN AND ASSOCIATION FOR PHYSICAL DOWNLINK CONTROL CHANNELS

PRIORITY

The present application claims the benefit under 35 U.S.C. §119(e) of U.S. Provisional Applications No. 61/588,590 and No. 61/673,899, which were filed in the United States Patent and Trademark Office on Jan. 19, 2012, and on Jul. 20, 2012, the entire disclosure of each of which is hereby incorporated by reference.

BACKGROUND OF THE INVENTION

1. Field of the Invention

The present invention relates to wireless communication systems. More specifically, the present invention relates to the transmission and reception of physical downlink control channels and to the design of associated reference signals.

2. Description of the Art

A communication system includes a DownLink (DL) that conveys transmission signals from transmission points, such as Base Stations (BS or NodeBs) to User Equipment (UE), and an UpLink (UL) that conveys transmission signals from UEs to reception points such as NodeBs. A UE, also commonly referred to as a terminal or a mobile station, may be fixed or mobile and may be a cellular phone, a personal computer device, etc. A NodeB is generally a fixed station and may also be referred to as an access point or some other equivalent terminology.

DL signals consist of data signals, carrying information content, control signals, and Reference Signals (RS), which are also known as pilot signals. A NodeB conveys data information to UEs through respective Physical Downlink Shared CHannels (PDSCHs) and control information through respective Downlink Control CHannels (CCHs). Multiple RS types may be supported, such as a Common RS (CRS) that can be used by all UEs and is transmitted over substantially an entire DL BandWidth (BW) and a DeModulation RS (DMRS) transmitted in a same BW as an associated PDSCH to a UE.

UL signals also consist of data signals, control signals and RS. UEs convey data information to a NodeB through respective Physical Uplink Shared CHannels (PUSCHs) and control information through respective Physical Uplink Control CHannels (PUCCHs). A UE transmitting data information may also convey control information through a PUSCH.

Downlink Control Information (DCI) serves several purposes and is conveyed through DCI formats in respective Physical Downlink Control CHannels (PDCCHs). For example, DCI includes DL Scheduling Assignments (SAs) for PDSCH receptions and UL SAs for PUSCH transmissions. The contents of a DCI format and consequently its size depend on the Transmission Mode (TM) a UE is configured for a respective PDSCH reception or PUSCH transmission. As PDCCHs are a major part of a total DL overhead, their required resources directly reduce DL throughput. One method for reducing PDCCH overhead is to scale its size according to the resources required to transmit the DCI formats during a DL Transmission Time Interval (TTI). For Orthogonal Frequency Division Multiple (OFDM) as the DL transmission method, a Control Format Indicator (CFI) parameter transmitted through a Physical Control Format Indicator CHannel (PCFICH) can be used to indicate a number of OFDM symbols occupied by PDCCHs in a DL TTI.

FIG. 1 is a diagram illustrating a structure for a DL TTI according to the prior art.

Referring to FIG. 1, a DL TTI includes one subframe 110 which includes two slots 120 and a total of $N_{symb}^{DL}$ symbols for transmitting data information, DCI, or RS. OFDM is assumed for DL signal transmissions and an OFDM symbol includes a Cyclic Prefix (CP). A first $M_{symb}^{DL}$ symbols are used to transmit DL CCHs 130 and these $M_{symb}^{DL}$ symbols may be dynamically indicated in each DL TTI through a Physical PCFICH transmitted in a first subframe symbol (not shown). Remaining $N_{symb}^{DL}-M_{symb}^{DL}$ symbols are used primarily to transmit PDSCHs 140. A transmission BW consists of frequency resource units referred to as Resource Blocks (RBs). Each RB includes $N_{sc}^{RB}$ sub-carriers, or Resource Elements (REs). A UE is $M_{PDSCH}$ allocated for a total of $M_{sc}^{PDSCH}=M_{PDSCH} \cdot N_{sc}^{RB}$ REs for a PDSCH transmission BW. Some REs in some symbols contain CRS 150 (or DMRS), which enable channel estimation and coherent demodulation of information signals at a UE. A PDSCH transmission in a second slot may be at a same BW or at a different BW than in a first slot. In the former case, a PDSCH transmission is referred to as localized while in the latter case it is referred to as distributed.

Additional control channels may be transmitted in a DL control region but they are not shown for brevity. For example, assuming use of a Hybrid Automatic Repeat reQuest (HARQ) process for data transmission in a PUSCH, a NodeB may transmit HARQ-ACKnowledgement (ACK) information in a Physical Hybrid-HARQ Indicator CHannel (PHICH) to indicate to a UE whether its previous transmission of each data Transport Block (TB) in a PUSCH was correctly detected (i.e., through an ACK) or incorrectly detected (i.e., through a Negative ACK (NACK)).

FIG. 2 is a diagram illustrating a DMRS structure according to the prior art.

Referring to FIG. 2, DMRS REs 210 and 215 in a RB over a subframe convey DMRS from four APs. A DMRS transmission from a first AP applies an Orthogonal Covering Code (OCC) of $\{1, 1\}$ 220 over two DMRS REs located in a same frequency position and are successive in the time domain while a second AP applies an OCC of $\{1, -1\}$ 225. A DMRS transmission from a third AP is in different REs than from a first AP and applies an OCC of $\{1, 1\}$ 230 over two DMRS REs located in a same frequency position and are successive in the time domain while a fourth AP applies an OCC of $\{1, -1\}$ 235. A UE receiver can estimate a channel experienced by a signal from an AP by removing a respective OCC at respective DMRS REs and also possibly by interpolating across respective DMRS REs.

FIG. 3 is a diagram illustrating an encoding process for a DCI format according to the prior art.

Referring to FIG. 3, a NodeB separately codes and transmits each DCI format in a respective PDCCH. A Radio Network Temporary Identifier (RNTI) for a UE, for which a DCI format is intended, masks a Cyclic Redundancy Check (CRC) of a DCI format codeword in order to enable the UE to identify that a particular DCI format is intended for the UE. The CRC of (non-coded) DCI format bits 310 is computed using a CRC computation operation 320, and the CRC is then masked using an exclusive OR (XOR) operation 330 between CRC and RNTI bits 340. The XOR operation 330 is defined as: XOR(0,0)=0, XOR(0,1)=1, XOR(1,0)=1, XOR(1,1)=0. The masked CRC bits are appended to DCI format information bits using a CRC append operation 350, channel coding is performed using a channel coding operation 360 (e.g., an operation using a convolutional code), followed by rate matching operation 370 applied to allocated resources, and finally, an interleaving and a modulation 380 operation are performed, and the output control signal 390 is transmitted. In the present example, both a CRC and a RNTI include 16 bits.

FIG. 4 is a diagram illustrating a decoding process for a DCI format according to the prior art.

Referring to FIG. 4, a UE receiver performs the reverse operations of a NodeB transmitter to determine whether the UE has a DCI format assignment in a DL subframe. A received control signal 410 is demodulated and the resulting bits are de-interleaved at operation 420, a rate matching applied at a NodeB transmitter is restored through operation 430, and data is subsequently decoded at operation 440. After decoding the data, DCI format information bits 460 are obtained after extracting CRC bits 450, which are then de-masked 470 by applying the XOR operation with a UE RNTI 480. Finally, a UE performs a CRC test 490. If the CRC test passes, a UE determines that a DCI format corresponding to the received control signal 410 is valid and determines parameters for signal reception or signal transmission. If the CRC test does not pass, a UE disregards the presumed DCI format.

To avoid a PDCCH transmission to a UE that is blocking a PDCCH transmission to another UE, a location of each PDCCH in the time-frequency domain of a DL control region is not unique. Therefore, a UE must perform multiple decoding operations to determine whether there are PDCCHs intended for the UE in a DL subframe. The REs carrying a PDCCH are grouped into Control Channel Elements (CCEs) in the logical domain. For a given number of DCI format bits in FIG. 2, a number of CCEs for a respective PDCCH depends on a channel coding rate (in the present example, a Quadrature Phase Shift Keying (QPSK) is used as the modulation scheme). A NodeB may use a lower channel coding rate (i.e., more CCEs) for transmitting PDCCHs to UEs experiencing a low DL Signal-to-Interference and Noise Ratio (SINR) than to UEs experiencing a high DL SINR. The CCE aggregation levels may include, for example, of $L_C \in \{1,2,4,8\}$ CCEs.

For a PDCCH decoding process, a UE may determine a search space for candidate PDCCHs after the UE restores the CCEs in the logical domain according to a common set of CCEs for all UEs (i.e., a Common Search Space (CSS)) and according to a UE-dedicated set of CCEs (i.e., a UE-Dedicated Search Space (UE-DSS)). A CSS may include the first C CCEs in the logical domain. A UE-DSS may be determined according to a pseudo-random function having UE-common parameters as inputs, such as the subframe number or the total number of CCEs in the subframe, and UE-specific parameters such as the RNTI. For example, for CCE aggregation levels $L_C \in \{1,2,4,8\}$, the CCEs corresponding to PDCCH candidate m are given by Equation (1).

CCEs for PDCCH candidate $m=L \cdot \{(Y_k+m) \bmod \lfloor N_{CCE,k}/L \rfloor\}+i$ (1)

In Equation (1), $N_{CCE,k}$ is a total number of CCEs in subframe k, i=0, ..., $L_C$−1, m=0, ..., $M_C^{(L_C)}$−1, and $M_C^{(L_C)}$ is a number of PDCCH candidates to monitor in a search space. For example, for $L_C \in \{1,2,4,8\}$, $M_C^{(L_C)}=\{6,6,2,2\}$, respectively. For the CSS, $Y_k=0$. For the UE-DSS, $Y_k=(A \cdot Y_{k-1}) \bmod D$ where $Y_{-1}=\text{RNTI} \neq 0$, A=39827 and D=65537.

DCI formats conveying information to multiple UEs are transmitted in a CSS. Additionally, if enough CCEs remain after the transmission of DCI formats conveying information to multiple UEs, a CSS may also convey some UE-specific DCI formats for DL SAs or UL SAs. A UE-DSS exclusively conveys UE-specific DCI formats for DL SAs or UL SAs. For example, a UE-CSS may include 16 CCEs and support 2 DCI formats with L=8 CCEs, or 4 DCI formats with L=4 CCEs, or 1 DCI format with L=8 CCEs and 2 DCI formats with L=4 CCEs. The CCEs for a CSS are placed first in the logical domain (prior to interleaving).

The DL control region in FIG. 1 uses a maximum of M=3 OFDM symbols and transmits a control signal substantially over a total operating DL BW. As a consequence, such control region has limited a capacity and cannot achieve interference coordination in the frequency domain. There are several cases where expanded capacity or interference coordination in the frequency domain is needed for transmission of control signals. One such case is a communication system with cell aggregation where the DL SAs or UL SAs to UEs in multiple cells are transmitted in a single cell (for example, because other cells may convey only PDSCH). Another case is extensive use of multi-UE spatial multiplexing of PDSCHs where multiple DL SAs correspond to same PDSCH resources. Another case is when DL transmissions from a first NodeB experience strong interference from DL transmissions from a second NodeB and DL interference co-ordination in the frequency domain between the two NodeBs is needed.

A direct extension of the maximum DL control region size to more than $M_{symb}^{DL}=3$ subframe symbols is not possible at least due to the requirement to support legacy UEs which cannot be aware of such extension. An alternative is to support DL control signaling in the conventional PDSCH region by using individual RBs to transmit control signals. A PDCCH transmitted in RBs of the conventional PDSCH region will be referred to as Enhanced PDCCH (EPDCCH).

FIG. 5 is a diagram illustrating an EPDCCH transmission structure according to the prior art.

Referring to FIG. 5, although EPDCCH transmissions start immediately after a conventional DL control 510 and are transmitted over all remaining DL subframe symbols, EPDCCH transmissions may instead start at a predetermined subframe symbol and extend over a part of remaining DL subframe symbols. EPDCCH transmissions may occur in four PRBs, 520, 530, 540, and 550, while remaining PRBs 560, 562, 564, 566, 568 may be used for PDSCH transmissions. As an EPDCCH transmission over a given number of subframe symbols may require fewer REs than the number of subframe symbols available in a PRB, multiple EPDCCHs may be multiplexed in a same PRB. The multiplexing can be in any combination of possible domains (i.e., time domain, frequency domain, or spatial domain) and, in a manner similar to a PDCCH, an EPDCCH includes at least one Enhanced CCE (ECCE).

A UE can be configured by higher layer signaling, such as Radio Resource Control (RRC) signaling, RBs that may convey transmissions of EPDCCHs. An EPDCCH transmission to a UE can be in a single RB if a NodeB has accurate DL channel information for the UE and can perform Frequency Domain Scheduling (FDS) or beam-forming. Otherwise, an EPDCCH transmission can be in multiple RBs. An EPDCCH transmitted over a single RB is referred to as localized while an EPDCCH transmitted over multiple RBs is referred to as distributed.

An exact design of a search space for EPDCCH candidates is not material to the present invention and may be assumed to follow the same or similar principles as a search space design for PDCCH candidates. Therefore, a number of EPDCCH candidates can exist for each possible ECCE aggregation level $L_E$ where, for example, $L_E \in \{1,2,4\}$ ECCEs for localized EPDCCH and $L_E \in \{1,2,4,8\}$ ECCEs for distributed EPDCCH. A UE determines EPDCCH candidates for each ECCE aggregation level in a search space according to predetermined functions similar to the one previously described for determining CPDCCH candidates for each CCE aggregation level.

The DMRS structure in FIG. 2 is intended for PDSCH transmissions and may not be appropriate for localized EPDCCH transmissions. In the following, two possible partitions of a RB over a subframe for constructing ECCEs are considered to illustrate some disadvantages of a DMRS structure as in FIG. 2 for localized EPDCCH transmissions.

FIG. 6 is a diagram illustrating a first option for an allocation of ECCEs in one RB over a number of subframe symbols according to the prior art.

Referring to FIG. 6, a partitioning of ECCEs is in the frequency domain, a RB includes 4 ECCEs, 610, 620, 630, and 640, and an EPDCCH transmission to a UE can consist of 1, 2, or 4 ECCEs. An EPDCCH transmission is assumed to start, for example, in a first subframe symbol after a conventional DL control region 650, if any, and extend in all remaining subframe symbols. Assuming that different beam-forming can apply for EPDCCH transmissions to different UEs, a UE may only use a DMRS contained in ECCEs of a respective EPDCCH candidate. Then, as ECCE #2 does not contain any DMRS, it cannot be used for an EPDCCH transmission with an aggregation level of 1 ECCE. Moreover, as a DMRS is located in different REs in different ECCEs, a channel estimator should apply a different interpolation filter in the frequency domain depending on the ECCEs of an EPDCCH transmission. Therefore, a DMRS structure in FIG. 2 is inappropriate for localized EPDCCH transmissions using an ECCE partitioning as in FIG. 6.

FIG. 7 is a diagram illustrating a second option for an allocation of ECCEs in one RB over a number of subframe symbols according to the prior art.

Referring to FIG. 7, a partitioning of ECCEs is in the time domain, a RB contains 2 ECCEs, 710 and 720, and an EPDCCH transmission to a UE can consist of 1 or 2 CCEs. An EPDCCH transmission is assumed to start, for example, in a first subframe symbol after a conventional DL control region 730, if any, and continue in all remaining subframe symbols. As a DMRS transmission power in each of the 2 ECCEs can be different and depend on a transmission power required for a respective EPDCCH to meet a target reception reliability, it is not practically feasible to use a channel estimate that is derived from a DMRS in both ECCEs if a Quadrature Amplitude Modulation (QAM) is used to transmit an EPDCCH. Moreover, the 2 ECCEs are not equivalent as they may contain a different number of REs leading to different effective coding rates and different detection reliability for respective EPDCCHs. Also, an ECCE partitioning pattern may be variable depending on a number of subframe symbols for a conventional DL control region. Therefore, a DMRS structure as in FIG. 2 is inappropriate for localized EPDCCH transmissions with the ECCE partitioning as in FIG. 7.

In addition to increasing a capacity of DL control signaling and offering interference coordination in the frequency domain, another main design objective of EPDCCH is to improve a corresponding spectral efficiency relative to PDCCH, thereby reducing an associated overhead and improving DL throughput. In addition to conventional beamforming or FDS, other significant mechanisms for improving an EPDCCH spectral efficiency include the use of spatial multiplexing among EPDCCH transmissions and the use of QAM16 modulation. RBs configured for potential EPDCCH transmissions but not used to transmit any EPDCCH in a subframe should be available to a UE for PDSCH reception.

To facilitate spatial multiplexing of EPDCCH transmissions to different UEs, a DMRS AP associated with an EPDCCH transmission to a UE should be such that it allows a NodeB to flexibly apply spatial multiplexing of EPDCCH transmissions to two UEs, thereby effectively doubling a corresponding spectral efficiency.

In order to support EPDCCH transmissions with QAM16 modulation, in addition to QPSK modulation, without negatively impacting a system operation and a UE complexity, a use of QAM16 should avoid increasing (doubling) a number of EPDCCH decoding operations a UE needs to perform in order to avoid a respective increase in a UE receiver complexity and avoid increasing the probability of a false CRC check.

Therefore, there is a need to design a DMRS for localized EPDCCH transmissions.

There is another need for a UE to determine whether or not to include in a PDSCH reception a RB configured to the UE for potential EPDCCH transmission.

There is another need to increase a flexibility of a NodeB in applying spatial multiplexing for EPDCCH transmissions to different UEs.

Finally, there is another need to support QAM16, in addition to QPSK, for EPDCCH transmissions to a UE without increasing a number of decoding operations at the UE.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and apparatus for designing a DeModulation Reference Signal (DMRS) used by a User Equipment (UE) to obtain respective channel estimates for demodulating respective Enhanced Physical Downlink Control CHannels (EPDCCHs), for determining at the UE a number of Resource Blocks (RBs) to include for a reception of a Physical Downlink Shared CHannel (PDSCH), for determining at the UE a Reference Signal (RS) antenna port in order to enable spatial multiplexing of EPDCCH transmissions to different UEs, and for supporting Quadrature Amplitude Modulation 16 (QAM16), in addition to Quadrature Phase Shift Keying (QPSK), for EPDCCH transmissions without increasing a number of decoding operations at the UE.

In accordance with an aspect of the present invention, a UE receives a PDSCH conveying data information and transmitted from a NodeB over a Transmission Time Interval (TTI) and over a set of RB Groups (RBGs). The PDSCH is scheduled by an EPDCCH transmitted from the NodeB over the TTI and over a subset of RBs in a set of RBs configured to the UE by the NodeB for potential transmission of EPDCCHs. The UE detects the EPDCCH over the subset of RBs to obtain the set of RBGs for PDSCH reception wherein a first RBG in the set of RBGs includes a first RB in the set of RBs. The UE receives the PDSCH in the first RBG wherein the first RBG includes the first RB if the first RB is not included in the subset of RBs or excludes the first RB if the first RB is included in the subset of RBs. Additionally, the UE demodulates the data information in the first RBG by obtaining a channel estimate from interpolating RS transmitted in symbols of the TTI and in REs in a second number of RBs in the first RBG, wherein the second number of RBs includes the first RB if the first RB is not included in the subset of RBs or excludes the first RB if the first RB is included in the subset of RBs. Moreover, the RS can be transmitted in a first number of REs if the RB is used to transmit PDSCH and in a second number of REs if the RB is used to transmit PDCCH wherein the first number of REs is different than the second number of REs.

In accordance with another aspect of the present invention, a UE demodulates control information in a candidate EPDCCH using a channel estimate obtained from a DMRS transmitted from a first AP of a NodeB (first DMRS AP), wherein the candidate EPDCCH includes one or more Enhanced Control Channel Elements (ECCEs) and is transmitted from the NodeB over a TTI and over a RB. The UE receives from the NodeB a Radio Network Temporary Identifier (RNTI) and computes a total number of ECCEs, $N_{ECCE}$, in the RB over the TTI and a first set of DMRS APs in the RB over the TTI wherein the first set of DMRS APs includes the first DMRS AP and is a subset of a predetermined second set of DMRS APs, and a total number of DMRS APs $N_{DMRS}$ in the first set of DMRS APs is equal to $N_{ECCE}$. The UE maps the candidate EPDCCH consisting of L ECCEs having respective indexes to REs in the RB over the TTI and computes the first DMRS AP from a value of a function that includes as its arguments the RNTI, at least one index of the L ECCEs, L, and $N_{ECCE}$. The function can further include an index of the RB or an index of the TTI. Additionally, $N_{ECCE}$ can be computed by a number of OFDM symbols in the TTI that are used to transmit the EPDCCH candidate or by a Cyclic Prefix (CP) length and $N_{DMRS}$ and $N_{ECCE}$ can have a first value in a first TTI and a second value in a second TTI. For L=1 each DMRS AP index in the first set of DMRS APs is uniquely mapped to each ECCE index. Moreover, the first DMRS AP can be the same for all indexes of the L ECCEs.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 2 is a diagram illustrating a DeModulation Reference Signal (DMRS) structure according to the prior art;

Throughout the drawings, it should be noted that like reference numbers are used to depict the same or similar elements, features, and structures.

DETAILED DESCRIPTION OF EXEMPLARY EMBODIMENTS

Figure 1:
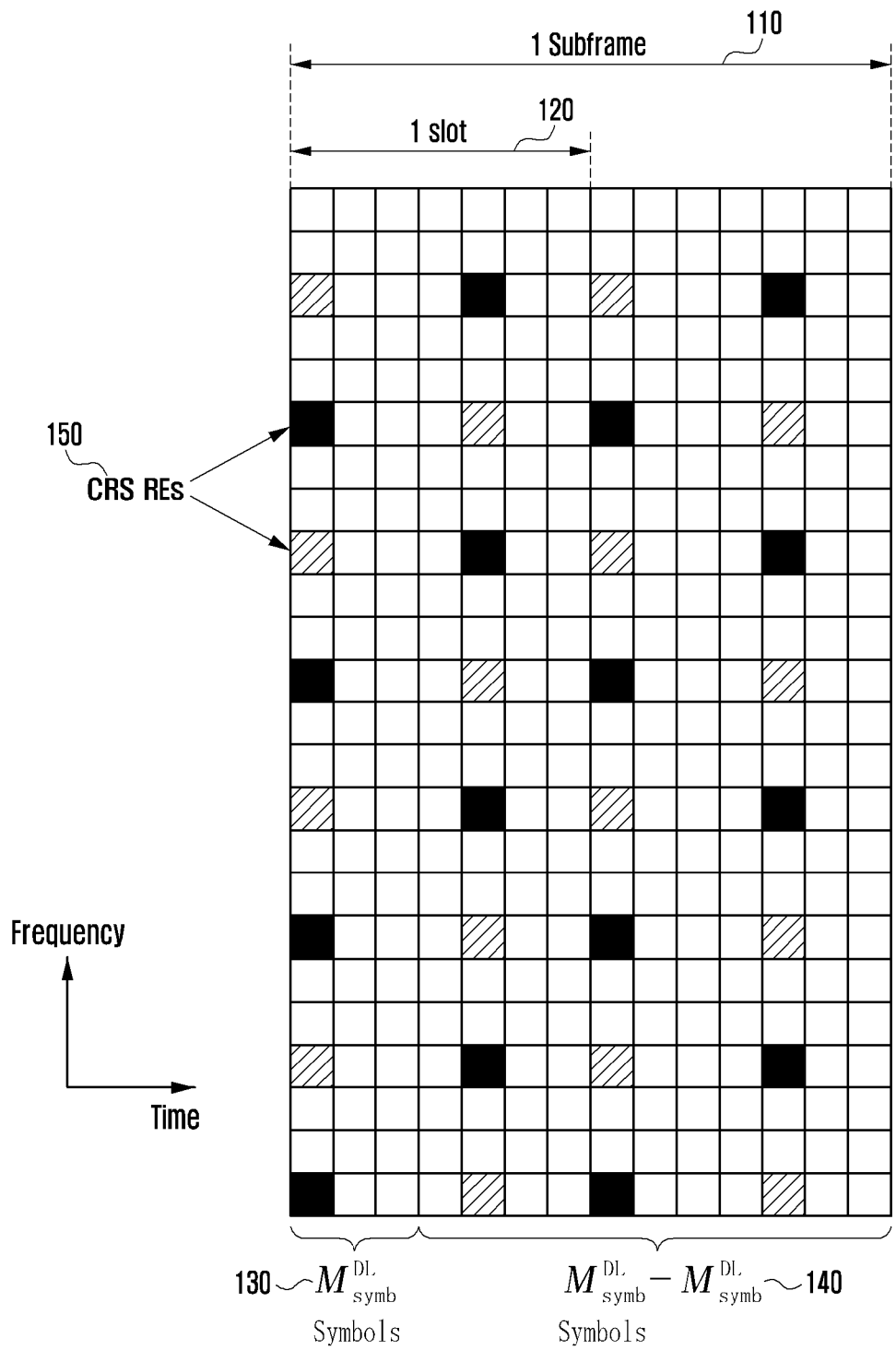
FIG. 1 is a diagram illustrating a structure for a DownLink (DL) Transmission Time Interval (TTI) according to the prior art.
Figure 3:
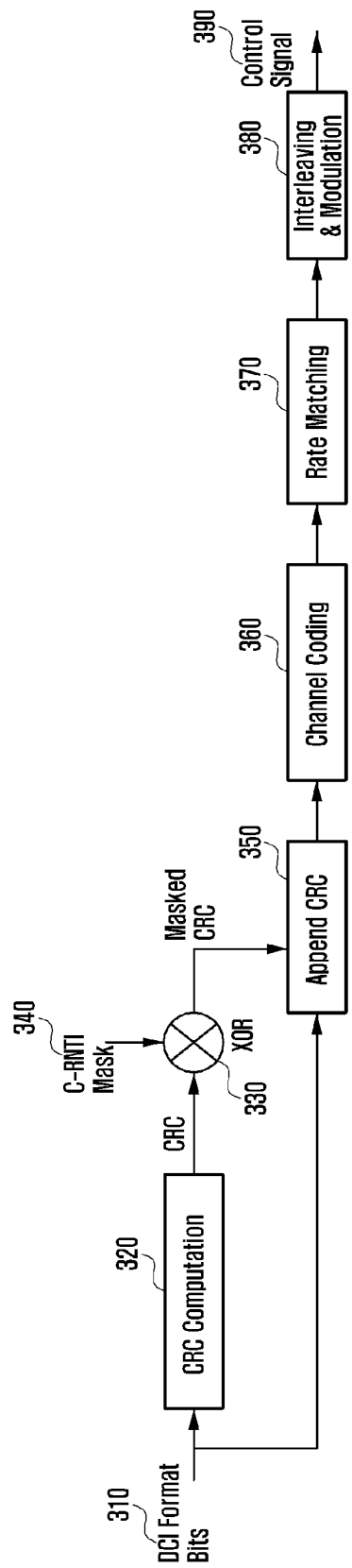
FIG. 3 is a diagram illustrating an encoding process for a Downlink Control Information (DCI) format according to the prior art.
Figure 4:
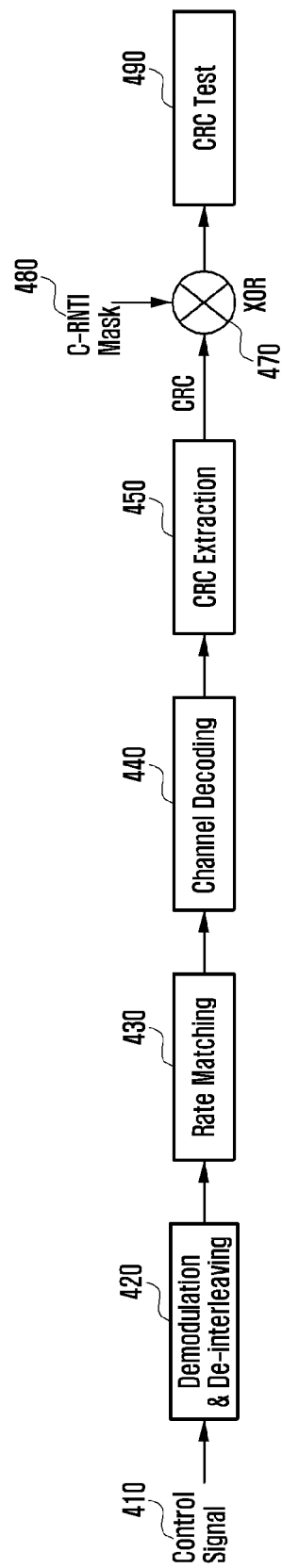
FIG. 4 is a diagram illustrating a decoding process for a DCI format according to the prior art.
Figure 5:
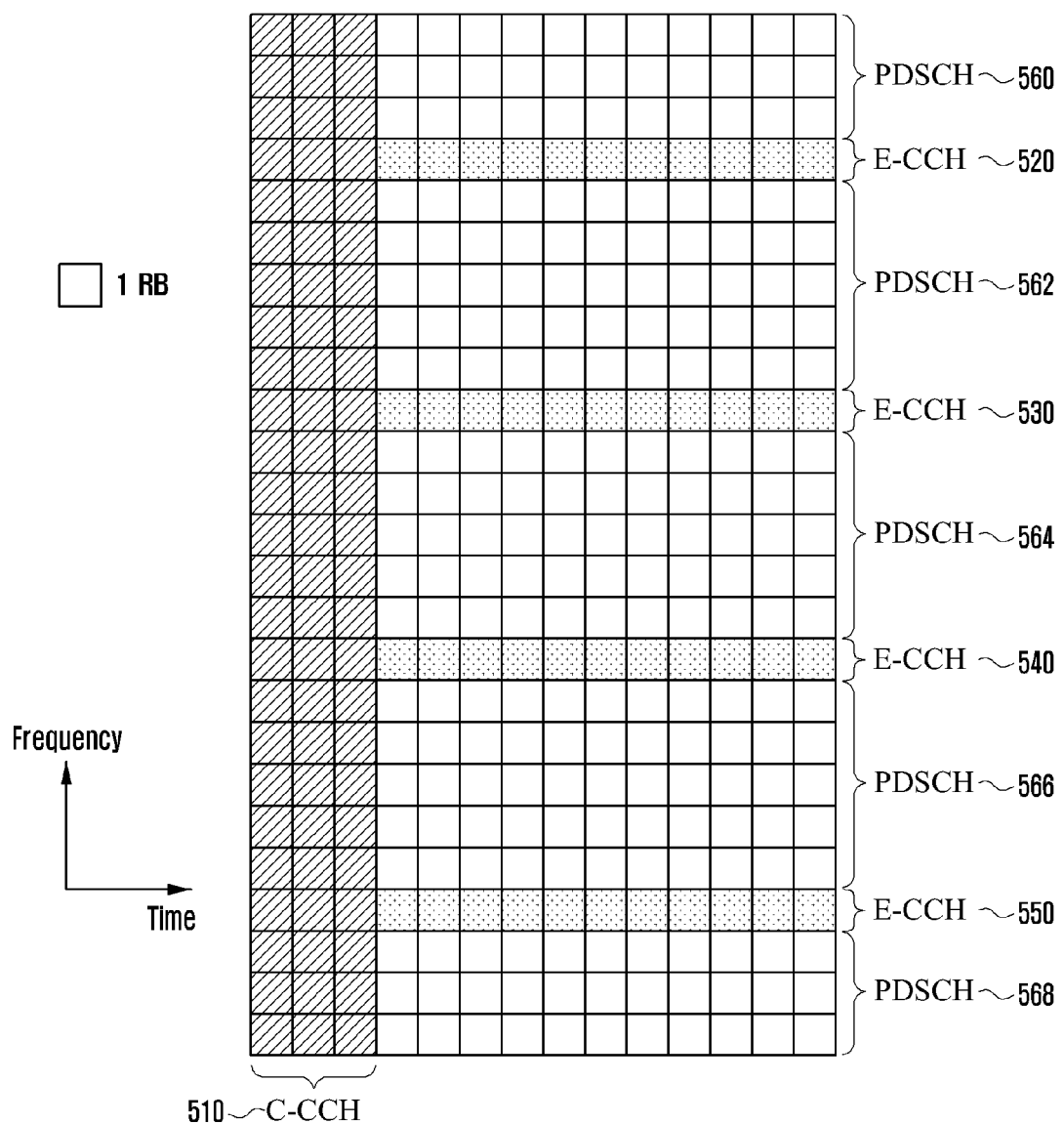
FIG. 5 is a diagram illustrating an Enhanced Physical Downlink Control CHannel (EPDCCH) transmission structure according to the prior art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Additionally, although exemplary embodiments of the present invention will be described below with reference to Orthogonal Frequency Division Multiplexing (OFDM), they also are applicable to all Frequency Division Multiplexing (FDM) transmissions in general and to Discrete Fourier Transform (DFT)-spread OFDM in particular.

A first exemplary embodiment considers a DeModulation Reference Signal (DMRS) design associated at least with transmissions of localized Enhanced Physical Downlink Control CHannels (EPDCCHs) and intending to fulfill several objectives enabling an efficient use of EPDCCHs and a simple transmitter and receiver design for transmitting and receiving EPDCCHs, respectively.

In order to maximally exploit a frequency selectivity of a DownLink (DL) channel and perform Frequency Domain Scheduling (FDS) or beamforming for EPDCCH transmissions while maintaining a fixed number of EPDCCH decoding operations at a User Equipment (UE) receiver, a resource granularity for localized EPDCCHs should be a minimum one allowed in a system operation. This minimum granularity consists of 1 Resource Block (RB) in the frequency domain and a number of subframe symbols in the time domain. A number of subframe symbols used for transmitting EPDCCHs can be fixed, such as all subframe symbols beginning at the fourth subframe symbol or, if UEs are assumed to also accurately detect a Physical Control Format Indicator CHannel (PCFICH), it may be variable as indicated by the PCFICH. In order to maximize a probability that a localized EPDCCH transmission occurs in a preferred RB, by either selecting a RB for which a beamforming gain or an EPDCCH Signal to Interference and Noise Ratio (SINR) is maximized, a NodeB should be able to allocate to a UE a set of non-contiguous RBs for localized EPDCCH transmissions.

Figure 6:
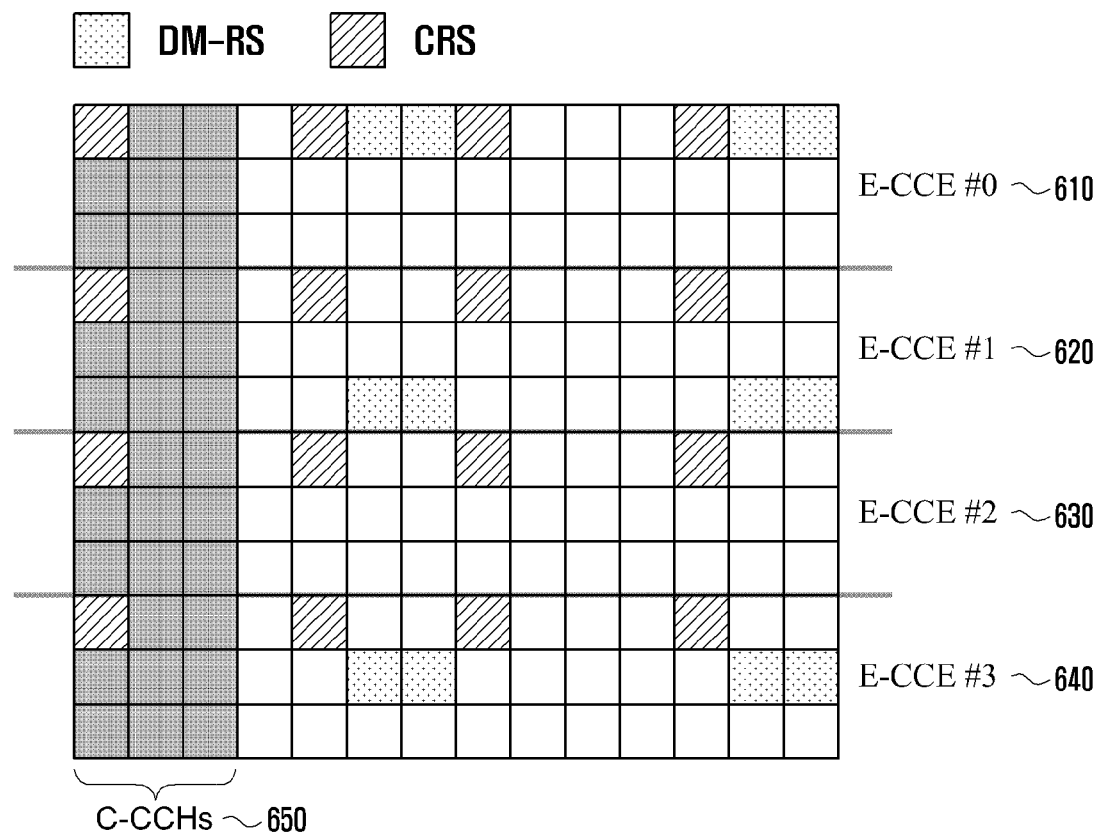
FIG. 6 is a diagram illustrating a first option for an allocation of Enhanced Control Channel Elements (ECCEs) in one Resource Block (RB) over a number of subframe symbols according to the prior art.
Figure 7:
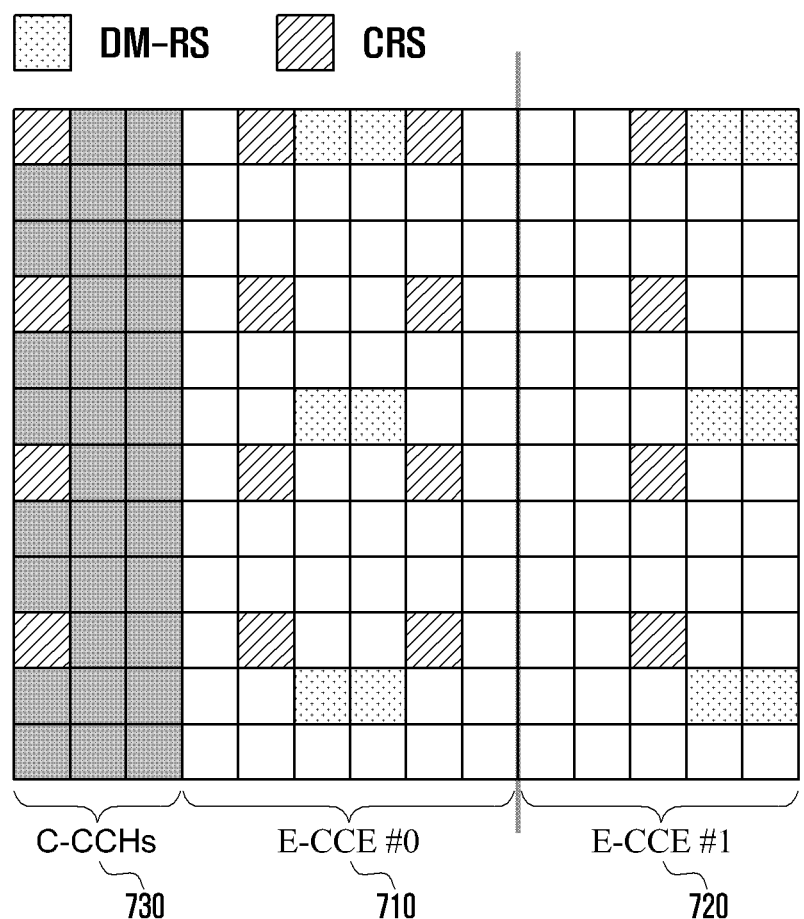
FIG. 7 is a diagram illustrating a second option for an allocation of ECCEs in one RB over a number of subframe symbols according to the prior art.

To avoid shortcomings of possible Enhanced Control Channel Element (ECCE) designs associated with the conventional DMRS structure in FIG. 2, as they were described with reference to FIG. 6 and FIG. 7, exemplary embodiments of the invention consider a DMRS structure that is applicable only in RBs used for transmissions of EPDCCHs while maintaining the conventional DMRS structure in RBs used for transmissions of Physical Downlink Shared CHannels (PDSCHs).

Figure 8:
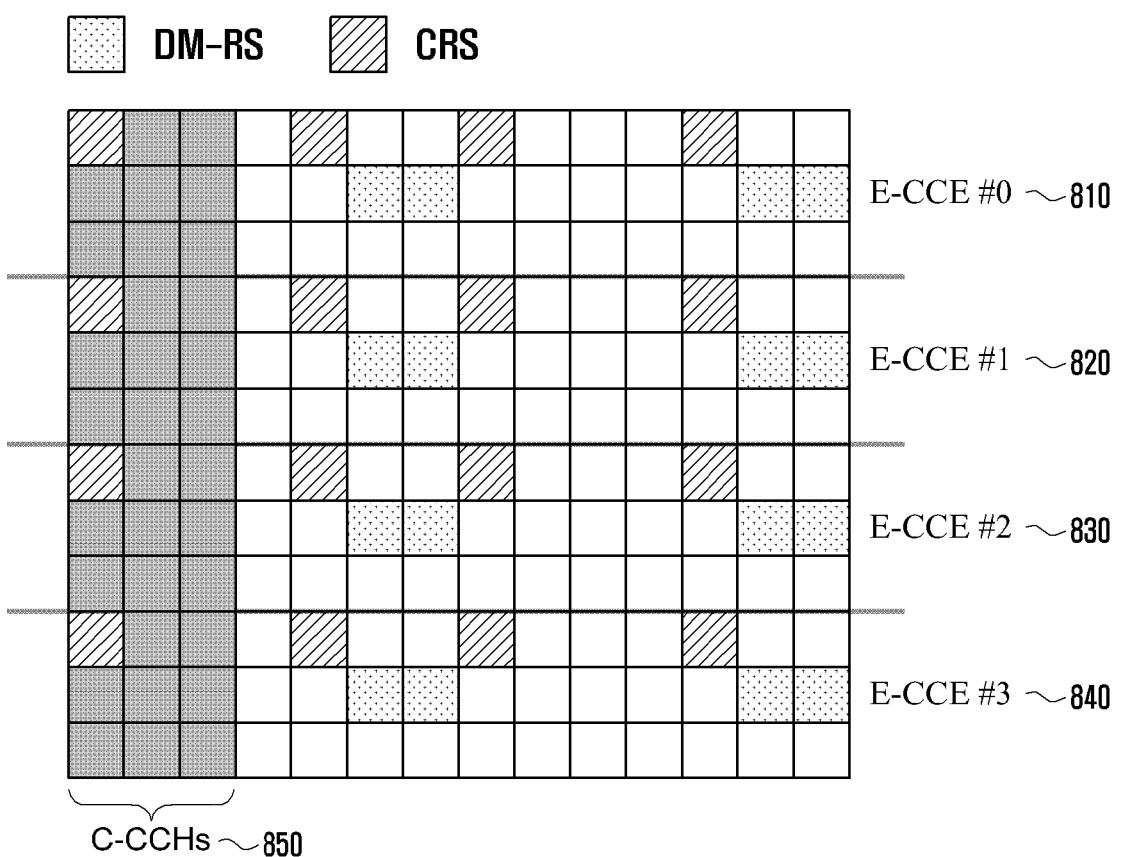
FIG. 8 is a diagram illustrating a DMRS structure in Resource Blocks (RBs) used for transmitting EPDCCHs according to an exemplary embodiment of the present invention.

FIG. 8 is a diagram illustrating a DMRS structure in RBs used for transmitting EPDCCHs according to an exemplary embodiment of the present invention.

Referring to FIG. 8, a partitioning of ECCEs is in the frequency domain, a RB includes 4 ECCEs, 810, 820, 830, and 840, and an EPDCCH transmission to a UE can include 1, 2, or 4 ECCEs. An EPDCCH transmission is assumed to start, for example, in a first subframe symbol after a conventional DL control region 850, if any, and continue in the remaining subframe symbols. A DMRS structure in a RB used for transmitting EPDCCHs is such that each ECCE contains a same number of DMRS Resource Elements (REs), these DMRS REs are in a same position in each ECCE, and a number of DMRS REs per RB is increased relative to the DMRS structure of FIG. 2. DMRS REs are optimally located in the middle of REs allocated to each ECCE, a same channel estimator can be used for interpolation in the time and in the frequency domain for any given ECCE aggregation level, and a channel estimator used for an aggregation level of 1 ECCE can be re-used for an aggregation level of 2 or 4 ECCEs by simply concatenating individual channel estimators corresponding to respective single ECCEs.

Due to a different DMRS structure in RBs conveying EPDCCH transmissions than in RBs conveying PDSCH transmissions, but also due to a possibility of applying different precoding between an EPDCCH transmission and a PDSCH transmission to a UE even if the DMRS structure is the same, in case a PDSCH transmission occurring in a multiple of RB Groups (RBGs) has a RBG that includes a RB used to transmit a respective EPDCCH, DMRS averaging (interpolation) across RBs in that RBG for PDSCH demodulation should exclude DMRS in the RB used to transmit the EPDCCH. A UE can include for DMRS averaging across RBs in a RBG a DMRS in a RB configured for EPDCCH transmissions, and also include that RB for PDSCH reception, only if it is so informed by a NodeB. For example, such information is provided through a DCI format scheduling the PDSCH (through a respective RB allocation field). This can be possible when a RB configured for EPDCCH is actually not used to transmit any EPDCCH in a given DL subframe and can then be allocated to transmit a PDSCH.

Figure 9:
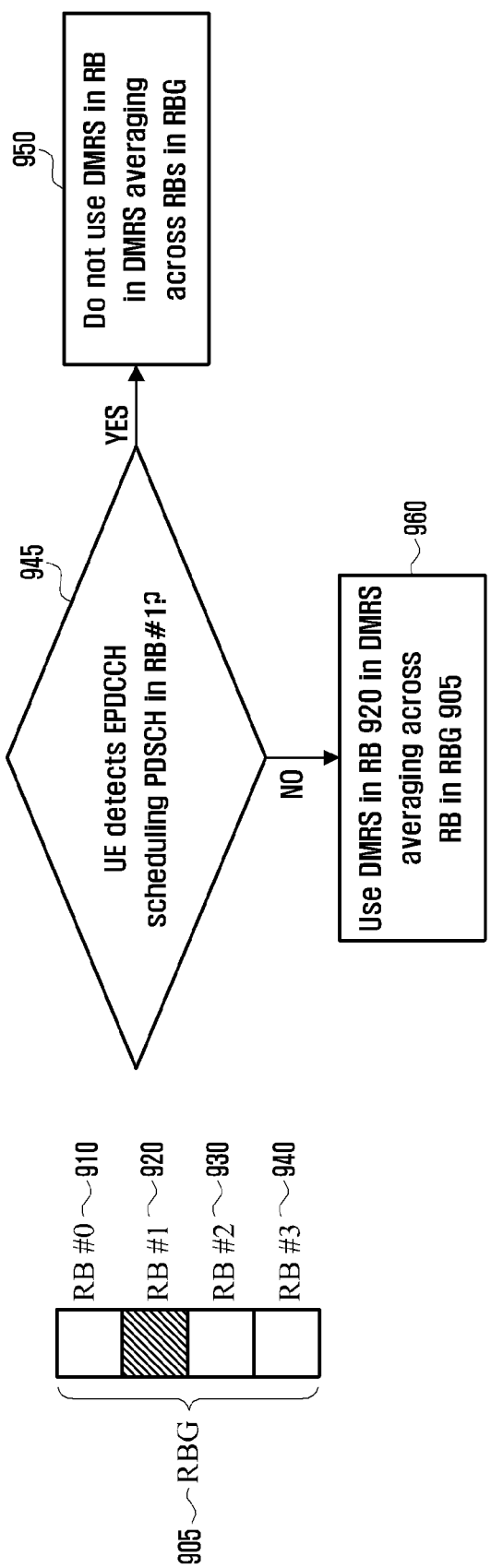
FIG. 9 is a diagram illustrating a conditional DMRS averaging across RBs in a Resource Block Group (RBG) according to an exemplary embodiment of the present invention.

FIG. 9 is a diagram illustrating a conditional DMRS averaging across RBs in a RBG according to an exemplary embodiment of the present invention.

Referring to FIG. 9, a RBG 905 includes 4 RBs 910, 920, 930, and 940. The second RB 920 in the RBG is configured by higher layer signaling for potential transmissions of EPDCCHs. In step 945, upon detection of an EPDCCH conveying a DCI format scheduling a PDSCH transmission including RBG 905 in RB 920, a UE excludes DMRS in RB 920 from DMRS averaging across RBs in RBG 905 in step 950. Conversely, if it is determined in step 945 that the EPDCCH conveying the DCI format is detected in another RB not included in RBG 905, DMRS in RB 920 is also included in DMRS averaging across RBs in RBG 905 in step 960.

A second exemplary embodiment considers an association of a DMRS AP with an EPDCCH candidate.

Conventional methods to assign for a UE a DMRS AP to an EPDCCH candidate include static and time-varying ones. A static assignment includes always having a default DMRS AP for all UEs, an explicit indication of a DMRS AP to a UE through prior higher layer signaling, or an implicit indication of a DMRS AP to a UE through a link to its assigned Radio Network Temporary Identifier (RNTI). Time-varying assignments may include dependence of a DMRS AP on a subframe number.

For all previous DMRS AP assignment methods, a DMRS AP assigned to a UE for demodulation of a respective EPDCCH is unique in a given subframe and a given RB. This can significantly limit a NodeB flexibility for spatially multiplexing EPDCCH transmissions to two UEs using the same ECCEs. Considering, for example, a DMRS structure as in FIG. 8 or as in FIG. 2, if two UEs happen to have a same DMRS AP assigned in all ECCEs in a RB in a subframe, spatial multiplexing of respective EPDCCH transmissions will not be practically possible as mutually orthogonal channel estimates cannot be obtained. As a number of DMRS APs is orders of magnitude smaller than a number of UEs that potentially have EPDCCH transmissions in a subframe, limitations in applying spatial multiplexing for EPDCCH transmissions can be significant.

To avoid limitations in applying spatial multiplexing for EPDCCH transmissions and enhance a spectral efficiency of EPDCCH transmissions by increasing a number of opportunities for respective spatial multiplexing, an assigned DMRS AP, $A_{DMRS}$, for an EPDCCH transmission to a UE is a function of the ECCE(s) for a respective EPDCCH candidate. In addition, an assigned DMRS AP $A_{DMRS}$ may also be derived using as initial reference a DMRS AP assigned to a UE by a static or by a time-varying assignment method as it was previously described.

For example, for 4 ECCEs per RB and for EPDCCH candidates corresponding to an aggregation level of 2 ECCEs, EPDCCH candidate m=0 may be transmitted in ECCEs 0 and 1 and EPDCCH candidate m=1 may be transmitted in ECCEs 2 and 3. Then, for a total of $N_{DMRS}=2$ DMRS APs and with N being a positive integer, an assigned DMRS AP $A_{DMRS}$ can be determined as:

$A_{DMRS}=0$ for both m=0 (ECCE 0 and ECCE 1) and m=1 (ECCE 2 and ECCE 3) for a UE with RNTI=4N $A_{DMRS}=0$ for m=0 (ECCE 0 and ECCE 1) and $A_{DMRS}=1$ for m=1 (ECCE 2 and ECCE 3) for a UE with RNTI=4N+1

$A_{DMRS}=1$ for m=0 (ECCE 0 and ECCE 1) and $A_{DMRS}=0$ for m=1 (ECCE 2 and ECCE 3) for a UE with RNTI=4N+2

$A_{DMRS}=1$ for both m=0 (ECCE 0 and ECCE 1) and m=1 (ECCE 2 and ECCE 3) for a UE with RNTI=4N+3

Figure 10:
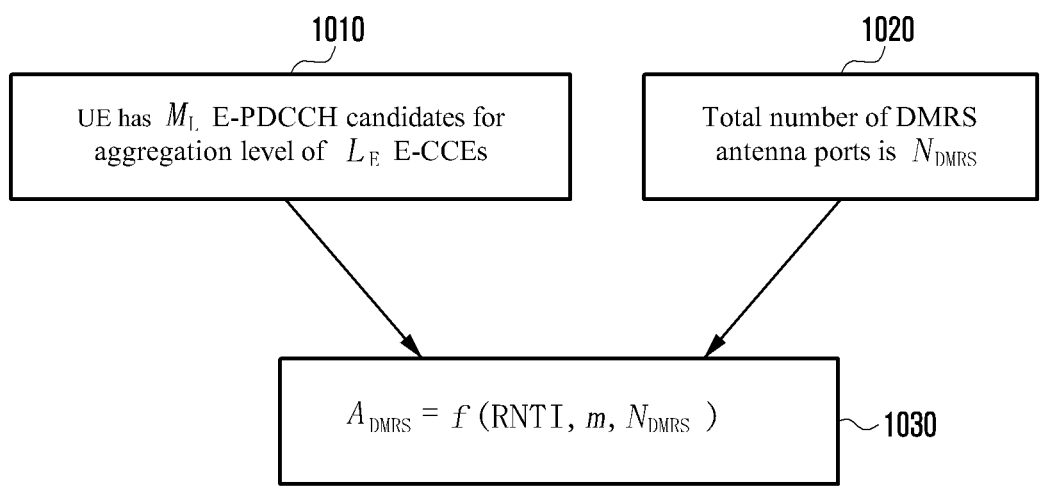
FIG. 10 is a diagram illustrating a dependence of an assigned DMRS Antenna Port (AP) to an EPDCCH candidate in a RB as a function of respective ECCEs and of a Radio Network Temporary Identifier (RNTI) assigned to a UE according to an exemplary embodiment of the present invention.

FIG. 10 is a diagram illustrating a dependence of an assigned DMRS AP to an EPDCCH candidate in a RB as a function of respective ECCEs and of a RNTI assigned to a UE according to an exemplary embodiment of the present invention.

Referring to FIG. 10, in a RB configured for transmissions of EPDCCHs, a UE has a total of $M_L$ EPDCCH candidates for an aggregation level of $L_E$ ECCEs in step 1010. A total number of DMRS APs is $N_{DMRS}$ in step 1020. A UE determines an assigned DMRS AP $A_{DMRS}$ for an EPDCCH candidate m as a function of its RNTI, the ECCEs of EPDCCH candidate m, $0 \le m \le M_L - 1$, and the number of available DMRS APs $N_{DMRS}$ as $A_{DMRS}=f(RNTI,m,N_{DMRS})$ in step 1030.

In addition to a DMRS AP associated with a transmission of an EPDCCH candidate being a function of ECCEs for a respective aggregation level of that EPDCCH candidate, it may also be a function of the respective RB. If a UE configured with $K_{RB}$ RBs for EPDCCH transmissions and a number of candidates for aggregation level of $L_E$ ECCEs in RB k, $0 \le k \le K_{RB}-1$ is $M_{L,k}$, then $A_{DMRS}=f(RNTI,m,N_{DMRS}, k)$ where m with $0 \le m \le M_{L,k}-1$ is an EPDCCH candidate with ECCEs i, i+1, ..., i+L−1.

As a number of REs in a RB over a subframe may vary as a function of a number of OFDM symbols used for a conventional DL control region and as a function of REs used to transmit other signals, such as Common Reference Signal (CRS) or CSI-RS, a number of ECCEs $N_{ECCE}$ in a RB over a subframe may be smaller than $N_{DMRS}$. For example, $N_{ECCE}=2$ while $N_{DMRS}=4$. In this case, only a predetermined subset of DMRS APs may be considered, such as a first and second DMRS APs or a first and third APs. Using only a first and second APs enables REs used by a third and fourth DMRS APs to be used either to transmit EPDCCH, thereby increasing a number of REs per ECCE compared to using all DMRS APs and improving an EPDCCH detection reliability as an effective transmission code rate is decreased, or to increase a transmission power of DMRS from a first and second APs, thereby improving a channel estimation accuracy and also improving an EPDCCH detection reliability. Using only first and third APs enables a transmission power of respective DMRS to be increased as there is no DMRS transmission on the same REs from second and fourth APs, respectively, using a different Orthogonal Covering Code (OCC) as illustrated in FIG. 2.

Figure 11:
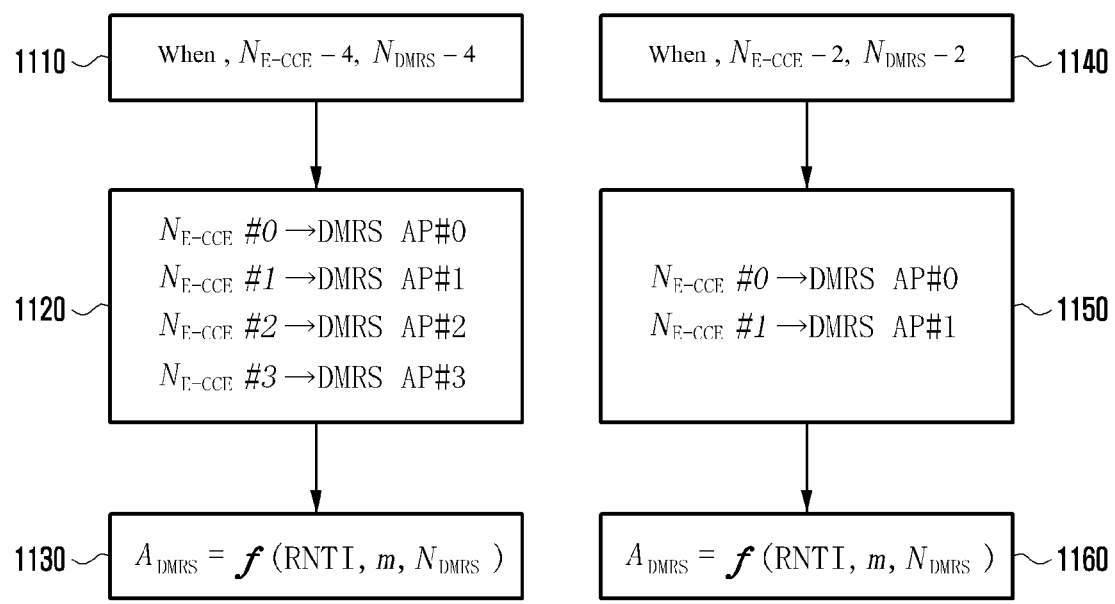
FIG. 11 is a diagram illustrating a conditional use of a number of DMRS APs depending on a number of ECCEs available for EPDCCH transmissions in a RB over a subframe according to an exemplary embodiment of the present invention.

FIG. 11 is a diagram illustrating a conditional use of a number of DMRS APs depending on a number of ECCEs available for EPDCCH transmissions in an RB over a subframe according to an exemplary embodiment of the present invention.

Referring to FIG. 11, when a first number of four ECCEs, $N_{ECCE}=4$, exists in a RB over a subframe, a UE assumes a number of four DMRS APs, $N_{DMRS}=4$ (equal to a first number of ECCEs) in step 1110. There is a one-to-one correspondence among DMRS APs and ECCEs in step 1120. If an EPDCCH transmission consists of one ECCE, it is uniquely associated with a DMRS AP while if an EPDCCH transmission consists of multiple ECCEs, a single DMRS AP is selected from these ECCEs also based on a UE RNTI, as it was previously described in step 1130. It is noted that since $N_{ECCE}=N_{DMRS}$, it is $A_{DMRS}=f(RNTI,m,N_{DMRS})=f(RNTI,m,N_{ECCE})$. When a second number of two ECCEs, $N_{ECCE}=2$, exists in a RB over a subframe, a UE assumes that a number of two DMRS APs, $N_{DMRS}=2$ (equal to a second number of ECCEs) in step 1140. Again, $A_{DMRS}=f(RNTI,m,N_{DMRS})=f(RNTI,m,N_{ECCE})$. There is again a one-to-one correspondence among DMRS APs and ECCEs in step 1150 and if an EPDCCH transmission consists of one ECCE, it is uniquely associated with a DMRS AP while if an EPDCCH transmission consists of multiple ECCEs, a single DMRS AP is determined from ECCEs of an EPDCCH while also considering a UE RNTI as it was previously described in step 1160. A subset consisting of a second number of two DMRS APs includes either a first and second DMRS APs located in the same REs and using different OCCs, as illustrated in FIG. 11, or a first and third APs located in different REs.

If a subset of a second number of DMRS APs includes first and second DMRS APs located in the same REs using different OCCs, a same mapping between ECCEs and DMRS APs may exist among ECCEs and DMRS APs regardless of a number of ECCEs (or a number of DMRS APs) if $A_{DMRS}=f(RNTI,m,N_{DMRS})=0$ or $A_{DMRS}=f(RNTI,m,N_{DMRS})=1$ when EPDCCH candidate m consists of ECCEs 0 and 1 or of ECCEs 0, 1, 2, and 3 (spatial multiplexing for EPDCCHs consisting of 4 ECCEs is then limited to only 2 UEs as either DMRS AP#0 or DMRS AP#1 is selected). For example, if an EPDCCH candidate m consists of ECCEs 0 and 1 or of ECCEs 0, 1, 2, and 3, then DMRS AP #0 is selected if RNTI is even and DMRS AP #1 is selected if RNTI is odd.

A number of ECCEs in a RB over a subframe may also be larger than a number of associated DMRS APs. For example, four ECCEs may exist in a RB over a subframe while only two DMRS APs, such as first and second DMRS APs may be configured for operation. Then, multiple ECCEs, such as two ECCEs, may be uniquely associated with a single DMRS AP, for example by associating a first or a second DMRS AP with a first two ECCEs or a second two ECCEs, respectively.

Alternatively, an EPDCCH operation with a maximum of four ECCEs in a RB over a subframe may be converted to an operation with a maximum of two ECCEs in a RB per subframe. This may be applicable, by design, for a communication system which when operating with a first Cyclic Prefix (CP) length, a maximum number of ECCEs per subframe is four (and a number of DMRS APs is also four) and when operating with a second CP length, a maximum number of ECCEs is two (and a number of DMRS APs is also two).

Figure 12:
FIG. 12 illustrates an allocation of a maximum number of ECCEs in a RB over a subframe depending on a Cyclic Prefix (CP) length according to an exemplary embodiment of the present invention.

FIG. 12 illustrates an allocation of a maximum number of ECCEs in a RB over a subframe depending on a CP length according to an exemplary embodiment of the present invention.

Referring to FIG. 12, if a communication system uses a first CP length for transmitting OFDM symbols in step 1210, a maximum of four CCEs exist in a RB over a subframe in step 1220 while if it uses a second CP length for transmitting OFDM symbols in step 1230, a maximum of two CCEs exist in a RB over a subframe in step 1240. A number of DMRS APs in case of a first CP length is four, for example four DMRS APs as illustrated in FIG. 2, while a number of DMRS APs in case of a second CP length is two, for example first and second DMRS APs as illustrated in FIG. 2.

A third exemplary embodiment considers support of both Quadrature Phase Shift Keying (QPSK) modulation and Quadrature Amplitude Modulation 16 (QAM16) modulation for EPDCCH transmissions.

To improve a spectral efficiency of EPDCCH transmissions, both QPSK and QAM16 modulations may be used. For example, a UE may periodically or upon request report to a NodeB a DL SINR it experiences over substantially an entire system DL BW. Based on such wideband SINR report, a NodeB may configure use of QPSK if the SINR is not very high and configure use of QAM16 otherwise. Alternatively, as it will be subsequently discussed, a NodeB may choose how to configure a number of EPDCCH candidates for each ECCE aggregation level and for each of the two modulation schemes. For localized EPDCCH transmissions utilizing beamforming or FDS, a SINR experienced by an EPDCCH transmission is typically expected to be better than a wideband SINR as a RB where a UE experiences more favorable SINR than a wideband SINR can be selected. A wideband SINR reflects long term DL channel conditions a UE experiences and is not typically subject to fast variations.

As QAM16 has twice the spectral efficiency of QPSK, for a same number of information bits in a DCI format and a same coding rate, an EPDCCH transmission using QAM16 would require half the ECCE aggregation level of an EPDCCH transmission using QPSK. However, this increase in the spectral efficiency by QAM16 requires an increase in the SINR of the EPDCCH transmission which, considering the Shannon capacity formula for high SINR values, is larger than the increase in the spectral efficiency. In practice, for moderate or high SINR values typically experienced in a cellular communication system and accounting for the larger sensitivity of QAM16 to channel estimation errors, QAM16 requires about 3-4 times the SINR required by QPSK while also requiring half the resources for conveying with the same reliability the same information payload using the same coding rate.

As QAM16 has double the spectral efficiency of QPSK and is applicable in practice only for UEs experiencing high SINRs, its support for larger ECCE aggregation levels, such as 4 ECCEs, may not be necessary. However, considering that a NodeB may need to balance a total transmission power among several EPDCCH transmissions, aggregation levels such as 4 ECCEs may also be supported with QAM16. Large ECCE aggregation levels may also be beneficial for EPDCCH transmissions in frequency-flat channels, such as channels experienced when a total DL BW is relatively small (e.g., a few RBs) or in low scattering environments, where a low coding rate may compensate an absence of frequency diversity.

A NodeB may configure a UE to decode EPDCCHs assuming either QAM16 or QPSK as the modulation scheme. To avoid increasing a number of EPDCCH decoding operations a UE needs to perform, a total number of EPDCCH candidates across all possible ECCE aggregation levels can remain the same. Additionally, to avoid increasing a decoding design complexity, QAM16 may use the same ECCE aggregation levels as QPSK even though it requires fewer resources for transmitting an EPDCCH. This is because the only benefit from using different ECCE aggregation levels for QPSK and QAM16 is from introducing a half ECCE aggregation level for QAM16 and, as resource savings relative to using one ECCE aggregation level are small, overall resource savings are typically negligible. However, a half ECCE aggregation level can be introduced for EPDCCH candidates associated with QAM16 modulation. Then, if a total number of EPDCCH candidates is $M_{candidates}^{total}$, a number of EPDCCH candidates for QPSK $M_{candidates}^{total,QPSK}$ and a number of EPDCCH candidates for QAM16 $M_{candidates}^{total,QAM16}$ are such that $M_{candidates}^{total,QPSK} + M_{candidates}^{total,QAM16} = M_{candidates}^{total}$. A total number of EPDCCH candidates is predetermined by the system operation so that a UE receiver can be accordingly designed.

A NodeB can configure a UE through higher layer signaling a number of candidates per ECCE aggregation level associated with QPSK and QAM16. Therefore, for $L_E \in \{1, 2, 4\}$ ECCE aggregation levels, a NodeB configures a UE with a respective number of $M_{candidates}^{L_E,QPSK}$ EPDCCH for QPSK and of $M_{candidates}^{L_E,QAM16}$ EPDCCH candidates for QAM16 where $$\sum_{L_E} M_{candidates}^{L_E,QPSK} = M_{candidates}^{total,QPSK} \text{ and } \sum_{L_E} M_{candidates}^{L_E,QAM16} = M_{candidates}^{total,QAM16}.$$

Prior to this configuration, a UE may assume that EPDCCH transmissions use only QPSK modulation and a number of EPDCCH candidates per ECCE aggregation level is defined in the system operation, for example $\{6,6,2\}$ EPDCCH candidates for aggregation levels of $\{1,2,4\}$ ECCEs, respectively. This may apply only if decoding of PDCCHs by a UE is not applicable since otherwise the associated higher layer signaling may be provided by a PDSCH scheduled by a PDCCH.

Figure 13:
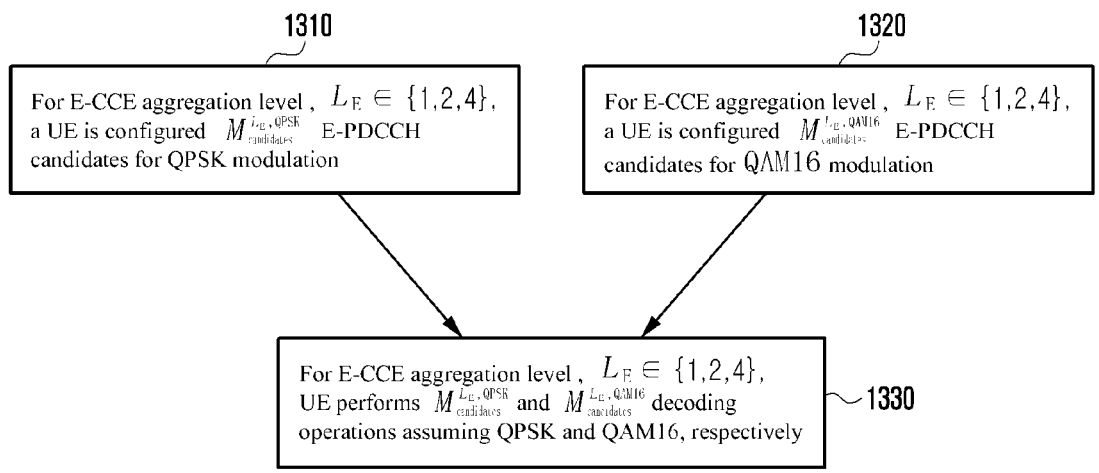
FIG. 13 is a diagram illustrating EPDCCH decoding operations when either Quadrature Phase Shift Keying (QPSK) or Quadrature Amplitude Modulation 16 (QAM16) is used according to an exemplary embodiment of the present invention.

FIG. 13 is a diagram illustrating EPDCCH decoding operations when either QPSK or QAM16 is used according to an exemplary embodiment of the present invention.

Referring to FIG. 13, a NodeB configures, for a UE, a number of $M_{candidates}^{L_E,QPSK}$ EPDCCH candidates for QPSK modulation for each respective aggregation level of $L_E \in \{1,2,4\}$ ECCEs in step 1310. The NodeB also configures, for a UE, a number of $M_{candidates}^{L_E,QAM16}$ EPDCCH candidates for QAM16 modulation for each respective aggregation level of $L_E \in \{1,2,4\}$ ECCEs in step 1320 (or $L_E \in \{0.5,1,2\}$ ECCEs). The UE performs $M_{candidates}^{L_E,QPSK}$ decoding operations for potential EPDCCH transmissions using an aggregation level of $L_E$ ECCEs and QPSK and $M_{candidates}^{L_E,QAM16}$ decoding operations for potential EPDCCH transmissions using an aggregation level of $L_E$ ECCEs and QAM16 in step 1330.

An explicit configuration of the modulation scheme for EPDCCH transmissions may not occur but instead only a number of EPDCCH candidates per ECCE aggregation level may be configured by higher layer signaling. Alternatively, a configuration of EPDCCH candidates for QAM16 modulation may only occur if QAM16 is configured.

If a UE is configured to simultaneously decode localized and distributed EPDCCH transmissions, use of QAM16 may be limited only to localized EPDCCH transmissions. Moreover, EPDCCH transmissions conveying UE-specific information in a CSS may always use QPSK and serve to enable maintaining communication with a UE in case it experiences a significant degradation in its channel conditions, for example as a result of a deep fade caused by shadowing, especially when the UE is configured a small number of EPDCCH candidates with QPSK modulation in the UE-DSS.

A configuration by a NodeB of a number of EPDCCH candidates for each ECCE aggregation level enables this number to be adjusted based on DCI formats that may be transmitted to a UE. For example, if a size of a DCI format corresponding to a PDSCH Transmission Mode (TM) is large, a NodeB may not configure any EPDCCH candidates for QPSK and an aggregation level of 1 ECCE and instead allocate more EPDCCH candidates to an aggregation level of 2 ECCEs. Conversely, if a size of a DCI format is small, an aggregation level of 8 ECCEs may not be configured with any EPDCCH candidates.

While the present invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A method for receiving data in a user equipment (UE) from a base station in a mobile communication system, the method comprising:
   receiving control information on an enhanced physical downlink control channel (EPDCCH) based on a demodulation reference signal (DM-RS) antenna port; and
   receiving the data based on the control information,
   wherein the DM-RS antenna port is determined based on information related to an enhanced control channel elements (ECCE) of the EPDCCH, a radio network temporary identity (RNTI) of the UE, and a number of ECCEs in the EPDCCH if a value of an aggregation level is larger than 1, and the DM-RS antenna port is determined based on the information related to the ECCE of the EPDCCH and the number of ECCEs in the EPDCCH with the exception of the RNTI of the UE if the value of the aggregation level is 1.

2. The method of claim 1, wherein the control information is received on the EPDCCH in a search space at the value of the aggregation level.

3. The method of claim 1, wherein a number of DM-RS antenna port candidates for the DM-RS antenna port is 4 if a number of enhanced resource-element groups (EREGs) per a ECCE is 4.

4. The method of claim 3, wherein a number of ECCEs in a physical resource block (PRB) set is 4.

5. The method of claim 1, wherein DM-RS antenna port candidates for the DM-RS antenna port are a first antenna port and a third antenna port among 4 DM-RS antenna ports if a number of enhanced resource-element groups (EREGs) per a ECCE is 8.

6. The method of claim 5, wherein a number of ECCEs in a physical resource block (PRB) set is 2.

7. The method of claim 1, wherein a number of DM-RS antenna port candidates for the DM-RS antenna port is 2 if an extended cyclic prefix (CP) is applied.

8. The method of claim 1, wherein the information related to the ECCE is an order of an EPDCCH candidate.

9. A method for transmitting data in a base station to a user equipment (UE) in a mobile communication system, the method comprising:
   transmitting control information on an enhanced physical downlink control channel (EPDCCH) based on a demodulation reference signal (DM-RS) antenna port; and
   transmitting the data based on the control information,
   wherein the DM-RS antenna port is determined based on information related to an enhanced control channel elements (ECCE) of the EPDCCH, a radio network temporary identity (RNTI) of the UE, and a number of ECCEs in the EPDCCH if a value of an aggregation level is larger than 1, and the DM-RS antenna port is determined based on the information related to the ECCE of the EPDCCH and the number of ECCEs in the EPDCCH with the exception of the RNTI of the UE if the value of the aggregation level is 1.

10. The method of claim 9, the control information is transmitted on the EPDCCH in a search space at the value of the aggregation level.

11. The method of claim 9, wherein a number of DM-RS antenna port candidates for the DM-RS antenna port is 4 if a number of enhanced resource-element groups (EREGs) per a ECCE is 4.

12. The method of claim 11, wherein a number of ECCEs in a physical resource block (PRB) set is 4.

13. The method of claim 9, wherein DM-RS antenna port candidates for the DM-RS antenna port are a first antenna port and a third antenna port among 4 DM-RS antenna ports if a number of enhanced resource-element groups (EREGs) per a ECCE is 8.

14. The method of claim 13, wherein a number of ECCEs in a physical resource block (PRB) set is 2.

15. The method of claim 9, wherein a number of DM-RS antenna port candidates for the DM-RS antenna port is 2 if an extended cyclic prefix (CP) is applied.

16. The method of claim 9, wherein the information related to the ECCE is an order of an EPDCCH candidate.

17. A user equipment (UE) apparatus for receiving data from a base station in a mobile communication system, the apparatus comprising:
   a transceiver for transmitting and receiving signals to and from the base station; and
   a controller configured to control the transceiver to receive control information on an enhanced physical downlink control channel (EPDCCH) based on a demodulation reference signal (DM-RS) antenna port, and to receive the data based on the control information,
   wherein the DM-RS antenna port is determined based on information related to an enhanced control channel elements (ECCE) of the EPDCCH, a radio network temporary identity (RNTI) of the UE, and a number of ECCEs in the EPDCCH if a value of an aggregation level is larger than 1, and the DM-RS antenna port is determined based on the information related to the ECCE of the EPDCCH and the number of ECCEs in the EPDCCH with the exception of the RNTI of the UE if the value of the aggregation level is 1.

18. The apparatus of claim 17, the controller is further configured for receiving the control information on the EPDCCH in a search space at the value of the aggregation level.

19. The apparatus of claim 17, wherein a number of DM-RS antenna port candidates for the DM-RS antenna port is 4 if a number of enhanced resource-element groups (EREGs) per a ECCE is 4.

20. The apparatus of claim 19, wherein a number of ECCEs in a physical resource block (PRB) set is 4.

21. The apparatus of claim 17, wherein DM-RS antenna port candidates for the DM-RS antenna port are a first antenna port and a third antenna port among 4 DM-RS antenna ports if a number of enhanced resource-element groups (EREGs) per a ECCE is 8.

22. The apparatus of claim 21, wherein a number of ECCEs in a physical resource block (PRB) set is 2.

23. The apparatus of claim 17, wherein a number of DM-RS antenna port candidates for the DM-RS antenna port is 2 if an extended cyclic prefix (CP) is applied.

24. The apparatus of claim 17, wherein the information related to the ECCE is an order of an EPDCCH candidate.

25. A base station apparatus for transmitting data to a user equipment (UE) apparatus in a mobile communication system, the apparatus comprising:
a transceiver for transmitting and receiving signals to and from the UE; and
a controller configured to control the transceiver to transmit control information on an enhanced physical downlink control channel (EPDCCH) based on a demodulation reference signal (DM-RS) antenna port, and to transmit the data based on the control information,
wherein the DM-RS antenna port is determined based on information related to an enhanced control channel elements (ECCE) of the EPDCCH, a radio network temporary identity (RNTI) of the UE, and a number of ECCEs in the EPDCCH if a value of an aggregation level is larger than 1, and the DM-RS antenna port is determined based on the information related to the ECCE of the EPDCCH and the number of ECCEs in the EPDCCH with the exception of the RNTI of the UE if the value of the aggregation level is 1.

26. The base station of claim 25, the controller is configured for transmitting the control information on the EPDCCH in a search space at the value of the aggregation level.

27. The base station of claim 25, wherein a number of DM-RS antenna port candidates for the DM-RS antenna port is 4 if a number of enhanced resource-element groups (EREGs) per a ECCE is 4.

28. The base station of claim 27, wherein a number of ECCEs in a physical resource block (PRB) set is 4.

29. The base station of claim 25, wherein DM-RS antenna port candidates for the DM-RS antenna port are a first antenna port and a third antenna port among 4 DM-RS antenna ports if a number of enhanced resource-element groups (EREGs) per a ECCE is 8.

30. The base station of claim 29, wherein a number of ECCEs in a physical resource block (PRB) set is 2.

31. The base station of claim 25, wherein a number of DM-RS antenna port candidates for the DM-RS antenna port is 2 if an extended cyclic prefix (CP) is applied.

32. The base station of claim 25, wherein the information related to the ECCE is an order of an EPDCCH candidate.

* * * * *